United States Patent [19]

Lee

[11] Patent Number: 5,692,588
[45] Date of Patent: Dec. 2, 1997

[54] CLUTCH CUT-OFF DEVICE OF AUTOMOBILE

[75] Inventor: Ho-Do Lee, Seoul, Rep. of Korea

[73] Assignee: Kia Motors Corporation, Seoul, Rep. of Korea

[21] Appl. No.: 675,763

[22] Filed: Jul. 3, 1996

[30] Foreign Application Priority Data

Feb. 23, 1996 [KR] Rep. of Korea .................. 96-4318

[51] Int. Cl.[6] .................................................. B60K 41/24
[52] U.S. Cl. ............................. 192/13 R; 74/478.5
[58] Field of Search ........................ 192/13 R, 13 A; 74/478.5, 478; 477/210, 211

[56] References Cited

U.S. PATENT DOCUMENTS

| 1,137,166 | 4/1915 | Peirce | 192/13 R |
| 1,709,254 | 4/1929 | Farmer et al. | 192/13 A |
| 2,132,006 | 10/1938 | Rourke | 192/13 R |
| 2,518,056 | 8/1950 | Olsen | 74/478.5 |
| 4,084,672 | 4/1978 | Avins | 192/13 R X |

FOREIGN PATENT DOCUMENTS 55-156726  12/1980  Japan ............................ 192/13 A Primary Examiner—Rodney H. Bonck

[57] ABSTRACT

The present invention provides a clutch cut-off device of an automobile, which includes a brake action flat and a clutch action flat projected from respectively a brake pedal shaft and a clutch pedal shaft confronting with each other, and also includes first and second rotating members rotatively installed between the brake pedal shaft and the clutch pedal shaft, and when a driver pedals a brake pedal, the first rotating member and the second rotating member are rotated in order by a descending of the brake action flat, thereby the clutch action flat descends and power transferred to a transmission from an engine is cut off by the descending of the clutch action flat.

3 Claims, 1 Drawing Sheet

CLUTCH CUT-OFF DEVICE OF AUTOMOBILE

BACKGROUND OF THE INVENTION

The present invention relates to a clutch of an automobile, and more particularly to a clutch cut-off device of the automobile for making a clutch pedal operated according to an operation of a brake pedal.

Generally, in case that one brakes a car in the midst of a car running, the driver pedals on a clutch pedal first to cut off power transferred to a change gear from an engine and then pedals on a brake pedal to operate the brake. But in a sudden braking of emergency situation, most drivers pedals with all their strength only the brake pedal without pedalling the clutch pedal. In such case, the power transferred to a driving wheel from the engine is not cut off, a braking force of the brake is transferred to the engine through the clutch and there is problem in that the engine stops. Also, in case that the car makes a stop on an uphill road and starts again, there is inconvenience in a successive operation of the driver for the brake pedal, the clutch pedal and an accelerator pedal.

SUMMARY OF THE INVENTION

It is therefore, an object of the present invention to provide a clutch cut-off device for cutting off a connection of a clutch by an operation of a brake pedal so that an engine suspension in a sudden braking may be prevented and simultaneously a start on an uphill road may be easy.

In accordance with the present invention for achieving the above object, the clutch cut-off device includes a brake action flat projected from a brake pedal shaft; a clutch action flat projected from a clutch pedal shaft, confronting with the brake action flat; a first rotating member rotatively installed in a space close to the brake pedal shaft, by a first fixation shaft, so that an end part of one side may be a given distance away from a lower part of the brake action flat; and a second rotating member rotatively installed between the first rotating member and the clutch pedal shaft, by a second fixation shaft, so that an end part of one side can be contacted with an upper part of the first rotating member and an end part of an opposite side can be contacted with an upper part of the clutch action flat.

Therefore, when a driver pedals the brake pedal, the brake action flat descending together with the brake pedal shaft contacts with the first rotating member to rotate the first rotating member. The first rotating member rotated by the brake action flat rotates the second rotating member, and the second rotating member rotated by the first rotating member pushes the clutch action flat in the lower direction. Accordingly, a power transfer to a transmission from an engine is cut off by the clutch pedal shaft descending together with the clutch action flat.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

Figure 1:
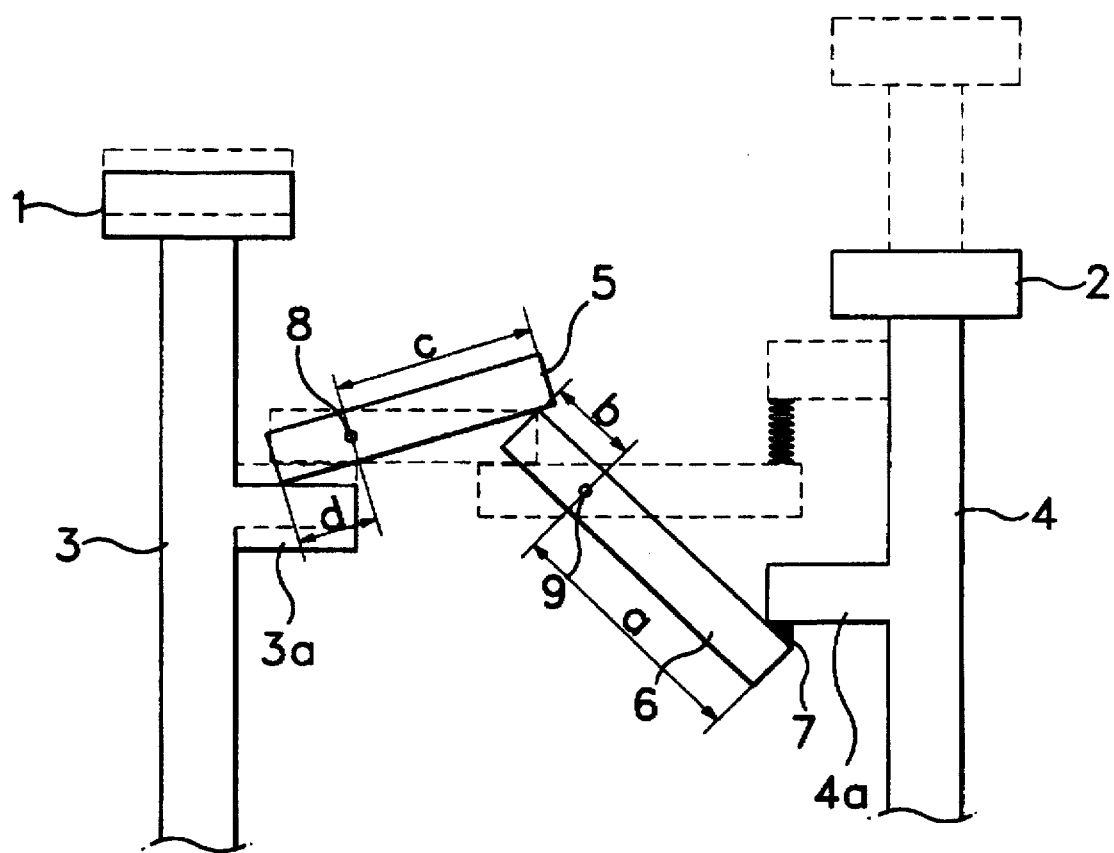
FIG. 1 is an operational phase diagram of a clutch cut-off device according to the present invention.

In the following description, numerous specific details are set forth to provide a more thorough understanding of the present invention. It will be apparent, however, to one skilled in the art, that the present invention may be practiced without these specific details. In other instances well known devices have not been described so as not to obscure the present invention.

Preferred embodiment of the present invention is illustrated in detail referring to the drawings.

As showing in FIG. 1, a clutch cut-off device according to the present invention includes a brake action flat 4a projected horizontally on one side of a brake pedal shaft 4, confronting with a clutch pedal shaft 3; a clutch action flat 3a projected on one side of the clutch pedal shaft 3, confronting with the brake action flat 4a; a first rotating member 6 rotatively installed in a space close to the brake pedal shaft 4, by a first fixation shaft 9, so that an end part of one side may be a given distance away from a lower part of the brake action flat 4a; an elastic member 7 such as a spring, for connecting elastically the brake action flat 4a and the first rotating member 6; and a second rotating member 5 rotatively installed between the first rotating member 6 and the clutch pedal shaft 3, by a second fixation shaft 8, so that an end part of one side can be contacted with an upper part of the first rotating member 6 and an end part of an opposite side can be contacted with an upper part of the clutch action flat 3a.

Meanwhile, it is preferable that a length (a) from the fixation shaft 9 to an end of the first rotating member 6, which faces the brake action flat 4a is longer than a length (b) from the first fixation shaft 9 to a end of an opposite side of the first rotating member 6, and it also is preferable that a length (c) from the second fixation shaft 8 to an end of the second rotating member 5, which faces the first rotating member 6 is longer than a length (d) from the second fixation shaft 8 to an end of an opposite side. The stated purpose for the above is so that an action force of the brake action flat 4a transferred to the clutch action flat 3a through the first and the second rotating members 5 and 6 may be maximized. It is also preferable that the brake action flat 4a connected by the elastic member 7 and the first rotating member 6 are the given distance away so that the clutch cut-off device of the present invention may be operated only in case that the driver pedals deeply the brake pedal 2.

The following illustrates operations of the clutch cut-off device according to the present invention as above-mentioned. When the driver pedals the brake pedal 2, the brake pedal shaft 4 is descended, thereby the brake action flat 4a is descended. In case that the brake action flat 4a descends more than a given depth, the brake action flat 4a is contacted with the first rotating member 6 to push an end part of one side of the first rotating member 6 in the lower direction. The first rotating member 6 whose end part of one side is pushed in the lower direction by the brake action flat 4a rotates in the center of the first fixation shaft 9. Therefore, an end part of an opposite side of the first rotating member 6 pushes an end part of one side of the second rotating member 5 in an upper direction. Also the second rotating member 5 whose end part of one side is pushed upwards by the first rotating member 6 rotates in the center of the second fixation shaft 8, in an opposite direction against the first rotating member 6 namely in the counterclockwise direction. Accordingly, the end part of opposite side of the second rotating member 5 rotated in accordence with the first rotating member 6 pushes the clutch action flat 3a in the lower direction. According to the descending of the clutch action flat 3a, the clutch pedal shaft 3 is descended, and by the descending of the clutch pedal shaft 3, the power transfer to the transmission from the engine is cut off.

When the driver takes his feet away from the brake pedal 2, the force operating on the brake pedal is removed and the brake pedal 2, the brake pedal shaft 4 and the brake action flat 4a move in an upper direction to return to an original place. Also the first rotating member 6 returns to the original place by a restoring force of the elastic member 7 connected to the brake action flat 4a. Even though the driver starts his car in a state he pedals only the brake pedal 2 without pedalling the clutch pedal 1, after the suspension in the uphill road, the brake pedal 2 and the clutch pedal 1 are operated at the same time and thereby the start is more easy.

In accordance with the present invention as aforementioned, the engine suspension caused by pedalling only the brake pedal in the sudden braking is prevented, and also in case of starting after the suspension in the uphill road, the inconvenience the driver should operate the brake and the clutch separately is solved, thereby there is an advantage that a convenience of a driving is improved.

What is claimed is:

1. A clutch cut-off device of an automobile, comprising:
   a brake action flat projected from a brake pedal shaft;
   a clutch action flat projected from a clutch pedal shaft, confronting with said brake action flat;
   a first rotating member rotatively installed in a space close to the brake pedal shaft, by a first fixation shaft, so that an end part of one side may be a given distance away from a lower part of said brake action flat; and
   a second rotating member rotatively installed between said first rotating member and said clutch pedal shaft, by a second fixation shaft, so that an end part of one side can be contacted with an upper part of said first rotating member and an end part of an opposite side can be contacted with an upper part of said clutch action flat.

2. The clutch cut-off device of the automobile as claimed in claim 1, wherein said first rotating member is connected to the brake action flat by an elastic member.

3. The clutch cut-off device of the automobile as claimed in claim 1, having a characteristic that a length from the first fixation shaft to an end of the first rotating member, which faces the brake action flat is longer than a length from the first fixation shaft to a end of an opposite side of the first rotating member, and a length from the second fixation shaft to an end of the second rotating member, which faces the first rotating member is longer than a length from the second fixation shaft to an end of an opposite side of the second rotating member, so that an action force of the brake action flat transferred to said clutch action flat through said first and second rotating members may be maximized.

* * * * *